June 20, 1933.  C. R. LIBBY  1,914,779
STOP MECHANISM
Filed May 23, 1930   3 Sheets-Sheet 1
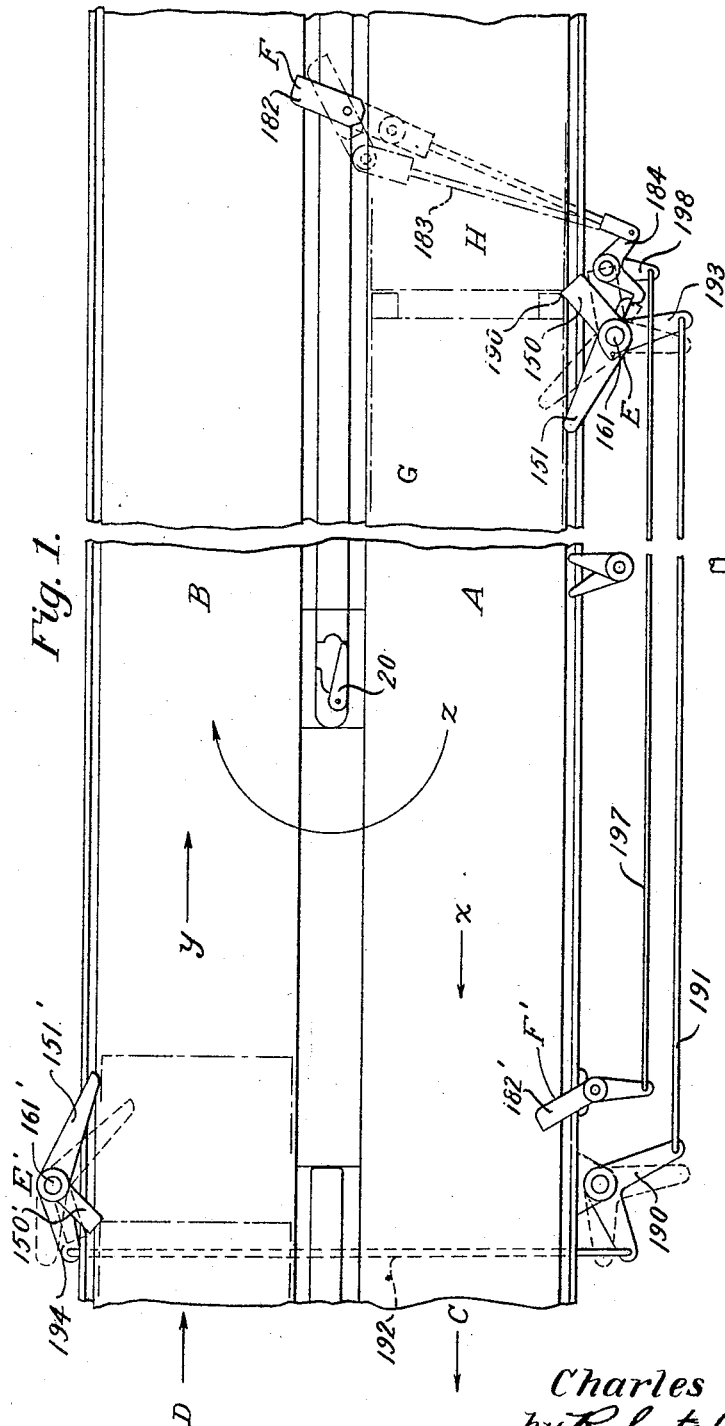
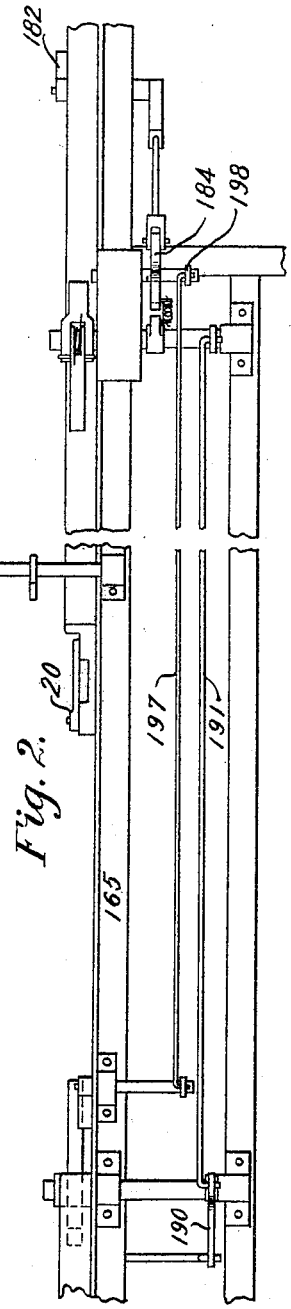
Inventor.
Charles Robert Libby.
by Roberts, Cushman + Woolbury
Attys.

Inventor:
Charles Robert Libby
Att'ys.

June 20, 1933.  C. R. LIBBY  1,914,779
STOP MECHANISM
Filed May 23, 1930  3 Sheets-Sheet 3
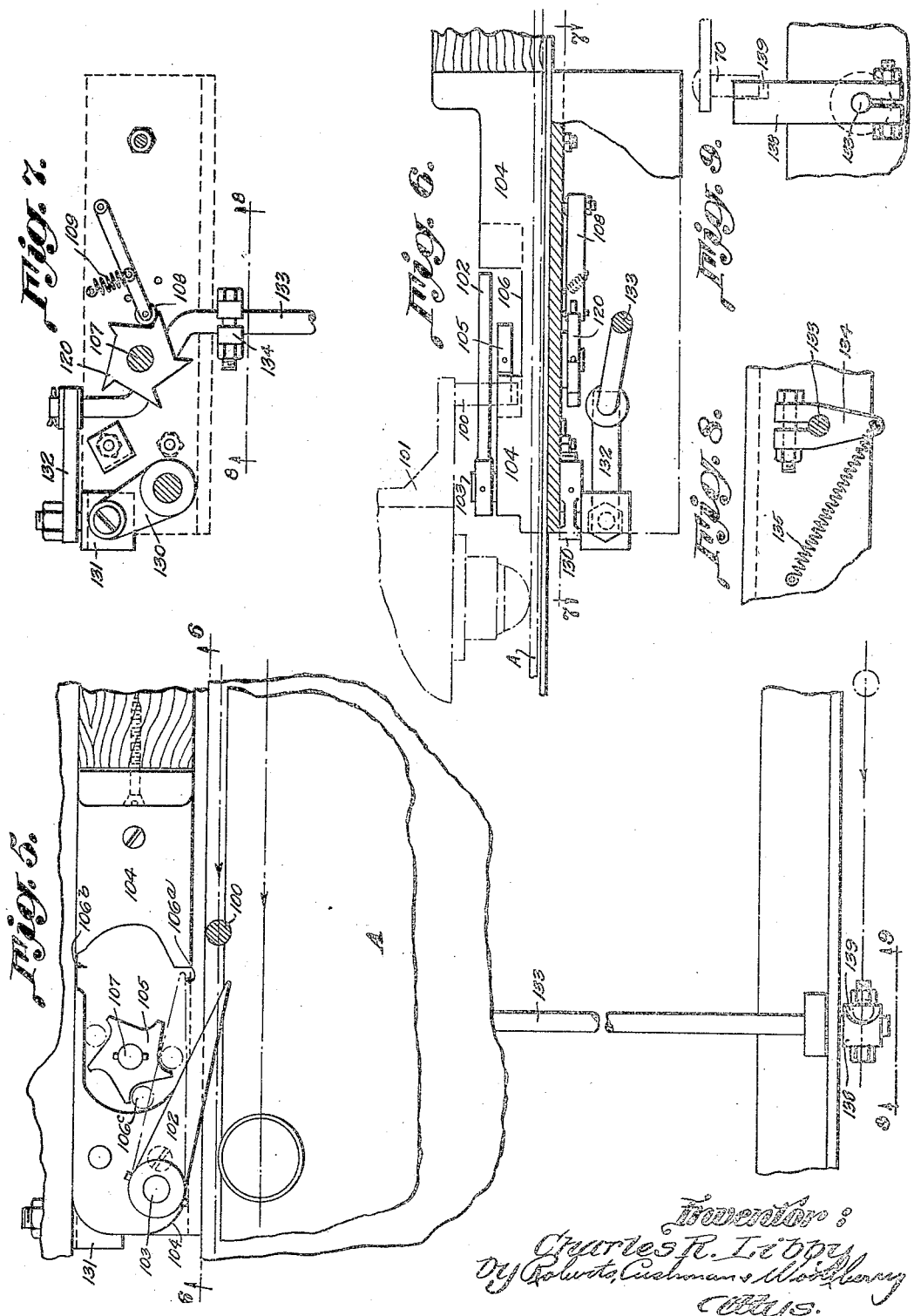

Patented June 20, 1933

1,914,779

UNITED STATES PATENT OFFICE

CHARLES ROBERT LIBBY, OF SYRACUSE, NEW YORK, ASSIGNOR TO THE LAMSON COMPANY, OF SYRACUSE, NEW YORK, A CORPORATION OF MASSACHUSETTS

STOP MECHANISM

Application filed May 23, 1930. Serial No. 454,935.

This invention relates to an improvement in article stop mechanism for conveyors and in one embodiment is applicable to conveying systems of the type described and claimed in the copending application of Herbert E. Schrader, filed on even date herewith under Serial No. 456,976.

The above-mentioned copending application describes a conveying system having two conveyors and including as part of the system, switching mechanism for transferring conveyed articles from one of the conveyors to the other. In general this switching is effected by restraining an abutment carried by a conveyed article to a short arcuate path leading from one conveyor to the other and allowing the conveyed article to be swung about its abutment from one conveyor to the other for instance by the forward movement of the two conveyors. The switching mechanism is selective and in the operation of the system certain articles are switched from one conveyor to the other while other articles are allowed to continue their movement past the switching mechanism without transfer. The particular manner in which the articles are transferred by switching, namely by being pivoted about an article-carried abutment, renders it especially desirable that the following conveyed articles shall be restrained in their forward movement until the swinging article being switched has cleared the conveyor from which it is being transferred.

The present invention provides stop mechanism for checking the forward movement of following articles and further provides for the release of this stop mechanism to allow a following article to resume its movement after the preceding article has passed the switching mechanism.

One object of this invention is to provide stop mechanism and associated release mechanism for the stop mechanism by which articles resume their movement in the shortest possible time after the preceding article has cleared the switching mechanism and in so doing my improved stop mechanism preferably does not rely upon a mere spacing of conveyed articles prior to their encountering the switching mechanism but provides a zone in the conveying system at the switching mechanism into which conveyed articles can not pass until the preceding conveyed article has been moved out of the zone.

Further objects of this invention are to provide mechanism for interposing a positive stop in the path of the following articles as soon as an article passing a stop will permit the stop to be advanced into a blocking position; to provide for the advance of the stop into blocking position immediately in rear of a passing article even in the case of two articles approaching the stop in abutting relation accomplishing this result without deflecting articles from side to side on the conveyor or twisting or otherwise altering their normal course; to provide stop mechanism actuable by moving articles and movable thereby into a locked blocking position and to provide article actuable means for unlocking the stop mechanism and for returning the stop mechanism to an inoperative position.

Other objects and advantages of my invention will be apparent from an explanation of specific instances of my invention in the following specification and in the accompanying drawings.

In the drawings:

Figs. 1 and 2 are a plan view and a side elevation respectively of a portion of the conveying system set forth in the above entitled application to which one embodiment of my improved stop mechanism has been applied;

Figure 5 is a fragmentary plan view of the article switching or transfer mechanism indicated at 20 in Figure 1, parts of the conveyor being broken away to illustrate certain structure lying below the conveying belt.

Figure 6 is a fragmentary vertical sectional view on the line 6—6 of Figure 5.

Figure 7 is a fragmentary horizontal sectional view taken on the line 7—7 of Figure 6.

Figure 8 is a fragmentary sectional view taken on the line 8—8 of Figure 7.

Figure 9 is a fragmentary side elevation taken on the line 9—9 of Figure 5 and showing in dotted lines the engagement of an abutment of a car or other conveyed article with a lever for effecting operation of the transfer of switching mechanism.

The conveying system shown in Fig. 1 includes conveyors A and B, herein shown as belt conveyors, moving in opposite directions as indicated by the arrows $x$ and $y$. A switch mechanism 20 is provided by which articles traveling upon the conveyor A may be transferred if desired to conveyor B as suggested by the curved arrow Z. Other articles may proceed along conveyor A as indicated by the arrow C and articles may also be fed along conveyor B as indicated by the arrow D.

It will be obvious that, when an article is being transferred by the switch mechanism 20 from the conveyor A to the conveyor B, means must be provided to prevent any collision between such article and an article advancing along the conveyor B. Moreover the switch mechanism can handle only one article at a time and in order to be assured that no article to be transferred slips by the switch mechanism means are also provided for stopping the procession of articles along the conveyor A following the article being manipulated by the switch mechanism. Such means comprise stop devices E and E' one for each conveyor and release devices F and F' similarly provided whereby the stop devices are rendered inoperative and the travel of articles upon the conveyors resumed. The general arrangement of these devices is indicated upon Fig. 1.

Figure 3:
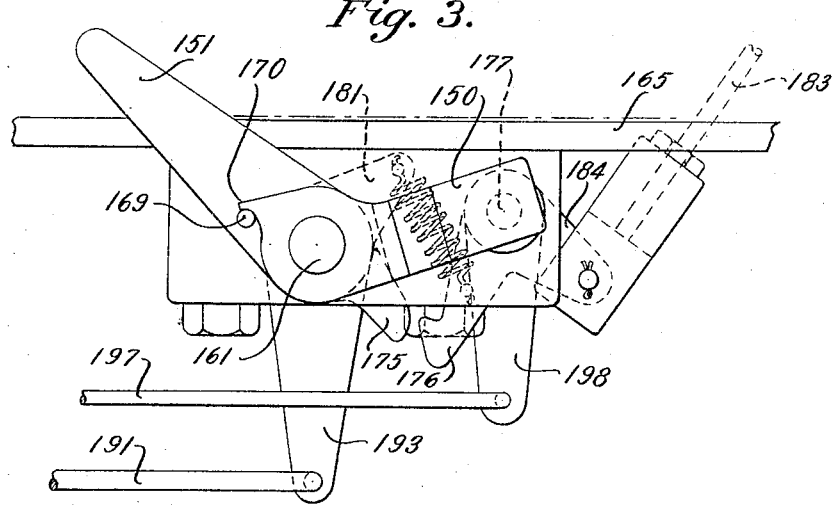
Fig. 3 shows, in enlarged plan view the stop device of my invention.
Figure 4:
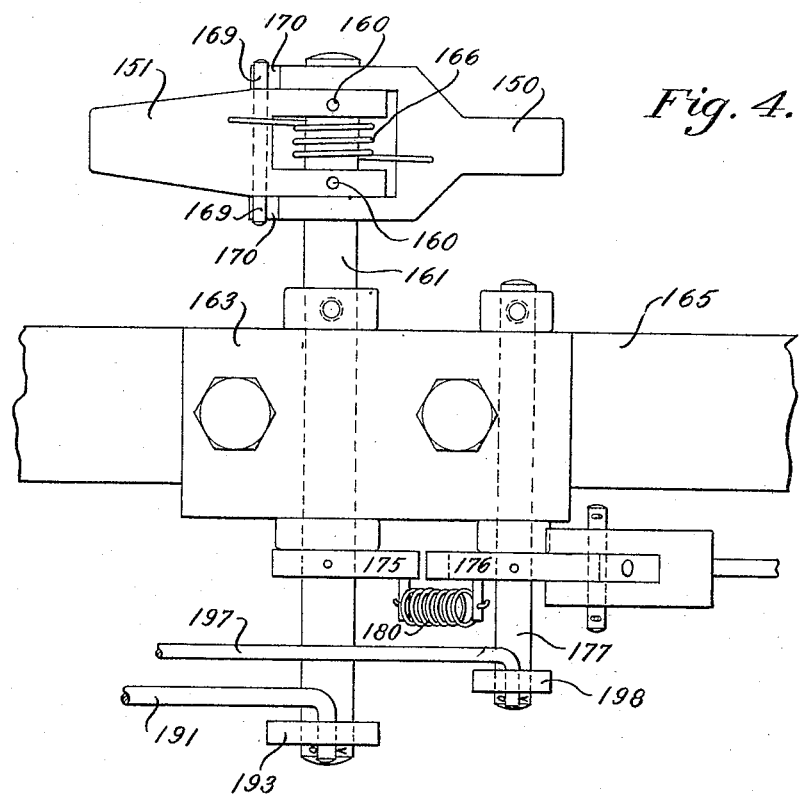
Fig. 4 is a side elevation of that device.

The stop device E, shown in detail in Figs. 3 and 4, comprises an article stop 150 and an article actuated arm 151. The arm 151 is fastened by pins 160 to a vertical rotatable shaft 161 mounted in a bearing block 163 suitably fastened to the conveyor frame work 165 adjacent the side of one of the conveyors. The article stop 150 is mounted for rotation upon the vertical shaft 161 and is constantly urged to rotate in a counterclockwise direction (Fig. 3) with respect to the article actuated arm 151, by means of a coil spring 166 surrounding the shaft 161 shown in Fig. 4. Preferably, as shown in Fig. 4 the article actuated arm 151 and the article stop 150 are bifurcated, the spring 166 being received in the bifurcation in the article engaging arm 151 and the article stop 150 straddling the article engaging arm. The ends 169 of a pin extending through the article engaging arm 151 engage the tips 170 of the article stop 150 to limit the counterclockwise rotation of the stop with respect to the arm. The yieldable connection between the article engaging arm 151 and the article stop 150 permits the article engaging arm to be moved out of the path of a conveyed article while the advance of the stop 150 into its blocking position is still obstructed by the article. For instance, referring to Fig. 1, an article G moving along on the conveyor A will engage the arm 151 and move it from the dotted line position to the full line position. Such movement of the arm 151 is transmitted to the stop 150 through the spring 166 but while the article is still passing the stop 150, the latter can advance only into the dotted line position until the article has traveled far enough to permit the stop 150 to spring outwardly to the full line position, in which position the stop 150 blocks the path of the following article H.

As shown in Fig. 1, the rear corner of each conveyed article is cut away as indicated at 190 on the side engaged by the article stop 150 to allow the article stop to assume its outermost and article-blocking position before it is engaged by the next succeeding conveyed article indicated in dotted lines. Such movement of the article stop into blocking position is thus possible even in the case of two abutting conveyed articles which are traveling in a straight line with their respective front and rear ends in contact.

In order to lock the article stop in its blocking position suitable latch mechanism is provided as shown in Figs. 3 and 4. Upon the vertical shaft 161 below the block 163 is fixed a horizontal arm 175, while a cooperating latch 176 is fastened upon a parallel vertical shaft 177 which latch may engage the arm 175 and prevent clockwise rotation of the shaft 161. A coil spring 180 fastened at opposite ends to the latch 176 and to a projection 181 upon the vertical shaft 161 is adapted yieldingly to transmit motion between the latch 176 and the vertical shaft 161. During the counterclockwise movement of the shaft 161 caused by the article-actuated arm 151 engaging an article, this spring 180 serves to move the latch 176 from its unlocked position shown in full lines in Fig. 3 to its locking position wherein it engages the arm 175 and prevents clockwise rotation of the shaft, thus holding the stop 150 in the path of the following articles.

A release device F is provided on the conveyor B for unlocking the stop mechanism and for moving the stop 150 into an inoperative position upon the passage by a predetermined point of the article, which actuated the stop mechanism and had been transferred by the switching mechanism. Such release device preferably comprises a trip 182 pivotally mounted upon the frame of the conveyor B and connected by means of a rod 183 to an arm 184 projecting from the latch 176. The trip normally occupies the full line position in Fig. 1 but is swung therefrom into the dotted line position by contact of the transferred article therewith. This movement of the trip swings the latch 176 in a counterclockwise direction, first, releasing the arm 175 affixed to the vertical shaft 161 and then acting through the spring 180 to rotate the vertical shaft 161, with its arm 151 and stop 150 in a clockwise direction. The arm 151 and stop 150 are thus returned from the full line position of Fig. 1 to the normal position of Fig. 3 wherein the stop 150 is inoperative. Hence, as soon as the article which has actuated the stop mechanism has passed the switch mechanism and is travelling upon the conveyor B the stop mechanism is returned to an inoperative position and the next following article is allowed to proceed along the conveyor A.

The article actuated arm 151 and its cooperating stop 150 are preferably duplicated upon the conveyor B at 151' and 150' respectively as shown in Fig. 1, these additional elements being associated with a vertical shaft 161' in the same manner as the previously described arm and stop. The two corresponding vertical shafts 161 and 161' are interconnected for simultaneous movement by means of a bell crank 190 and rods 191 and 192 connected respectively to arms 193 and 194 fast to the shafts 161 and 161'. In this way the actuation of either of the article-actuated arms 151 or 151' serves to move both vertical shafts 161 and 161' and also both article stops 150 and 150'. An article approaching the switch and traveling upon conveyor A will thus actuate both stops 150 and 150', thus blocking the movement of articles on both conveyor A and conveyor B toward the switch. Likewise an article approaching the switch upon conveyor B will actuate the arm 151' to move both article stops 150' and 150 into their blocking positions where they will remain until the article engages the release mechanism F and thus returns the stops to inoperative position.

Since only certain articles are transferred to the conveyor B by the switch mechanism while others continue along conveyor A, a second release mechanism F' operating in parallel with the previously described release mechanism F is provided on conveyor A whereby such articles release the stops 150 and 150' after passing the switch. In the present instance this is accomplished by providing a trip 182' pivotally mounted upon the conveyor frame 165. This trip 182' is connected by means of a rod 197 to a projection 198 upon the latch shaft 177 so that movement of the trip 182' by a passing article releases the latch and returns the stops to inoperative positions in the same manner as similar actuation of the trip 182.

While this invention has been shown and described in connection with the conveying system set forth in the above mentioned Schrader application it will be understood that it is not limited thereto but is applicable to various conveyor systems wherever it is desired to interrupt the travel of articles or to separate them a predetermined distance apart. By way of example of switching or transfer mechanism to which the present invention is particularly applicable, Figures 5 to 9 inclusive illustrate the switching or transfer mechanism of said Schrader application.

Referring to Fig. 6 the car or other article conveyed is preferably provided with an abutment for engaging the transfer mechanism which serves to remove the cars from one belt, for instance belt A, and place them on the opposite belt. In the present instance this abutment comprises a pin 100 depending from a fixed bracket 101 on the rear right hand end of the article. Referring to Figs. 5 to 9, a preferred mechanism for transferring articles from one belt to the other and which may be utilized as the transfer mechanism 20 provided in the system explained above, includes a deflector finger 102 fixed to a vertical shaft 103 which is pivotally mounted in a fixed casting 104, fitted between the runs of the conveyor, the deflector finger 102 being positioned as shown in Fig. 6 slightly above the level of the conveyor belts. In the normal and inoperative position of this deflector finger 102 indicated in dotted lines in Fig. 5, the abutment 100 carried by an article passes the deflector finger 102 without making contact therewith and the article to which the abutment is attached continues along its previous path. A toothed wheel 105 (Fig. 5) fixed to a shaft 107 is provided within a recess 106 in the casting 104. Referring to Fig. 5, the recess 106 is open at 106ª to receive the fixed deflector abutment 100 of an article and is open at 106ᵇ to permit the disengagement of this abutment, the recess thus leading from one conveyor to adjacent the other conveyor. One wall 106ᶜ of the recess is disposed in the form of an arc to provide an arcuate path for abutments 100 in contact with the toothed wheel 105. Upon movement of the deflector finger 102 into its outer and operative position as shown in Fig. 5, a deflector abutment 100 upon a moving article will be engaged by this deflector finger 102, and be deflected into contact with one of the teeth of the wheel 105. The forward motion of the conveyor upon which the article has been travelling, as well as the momentum of the article swings the article about this abutment 100, from one conveyor onto the other. This swinging movement of the article, coupled with the pull upon the article by the conveyor which thus receives the article, serves to move the article-carried deflector abutment 100 in an arcuate path along the curved wall 106ᶜ of the recess in the casting 104 thus forcing the toothed wheel 105 to rotate. Upon rotation of the wheel 105 through about 180 degrees, the article-carried abutment 100 becomes disengaged therefrom and is drawn out through the side opening 106$^b$ of the recess 106 by the pull of the conveyor upon the article. The toothed wheel 105 and its co-operating recess 106 in the casting are arranged yieldingly to oppose movement of the deflector abutment of an article from one conveyor to the other. This result is preferably accomplished by the provision below the casting of a cam wheel 120 mounted on the vertical shaft 107 and cooperating with a follower 108 forced against its outer surface by spring 109 to oppose rotation of the shaft 107 and hence of the upper toothed wheel 105. By thus opposing motion of the abutment 100 through the path afforded by the recess 106 from adjacent one conveyor to adjacent the other conveyor, the swinging of the car or the article and the movement of the car or article-carried abutment are affected simultaneously, the abutment functioning as a moving pivot for the car or article.

The deflector finger 102 may be actuated in any desired manner, for example by means of an abutment 70 (Fig. 9) in the forward outer or left end of an article or car of the system. As shown, the vertical shaft 103 upon which the deflector finger is mounted carries below the casting 104 an arm 130 (Fig. 7) having at its outer end a universal joint 131 which in turn is connected by a link 132, to the offset end of a crank shaft 133 extending to the opposite or left hand side of the adjacent belt. The crank shaft 133 which is suitably mounted for rotation in the under frame of the conveyor carries at its outer or left hand end an arm 138 (Figs. 5 and 9) adapted to be engaged and moved by said abutment 70, so as to turn the deflector finger 102.

I claim:

1. Stop mechanism actuable by a moving article on a conveyor to block the passage of a succeeding article, comprising an article-engaging arm normally disposed in the path of moving articles, a normally inoperative stop, and means in engagement at all times with said arm and stop and operable upon movement of said arm by a passing article for yieldingly moving said stop into the path of succeeding articles.

2. Stop mechanism actuable by a moving article on a conveyor to block the passage of a succeeding article, comprising an article-engaging arm normally disposed in the path of moving articles and movable by said articles to permit passage thereof, a stop movable into a position to obstruct the passage of succeeding articles, and a yieldable connection in engagement with said article-engaging arm and said stop at all times for moving the stop into obstructing position, said yieldable connection permitting said arm to move out of the path of an article engaged thereby while the movement of the stop into obstructing position is prevented by said article and thereafter advancing the stop into such position to obstruct the passage of succeeding articles.

3. Stop mechanism actuable by a moving article on a conveyor to block the passage of a succeeding article, comprising an article-engaging arm normally disposed in the path of moving articles and movable by said articles to permit passage thereof, a stop movable into a position to obstruct the passage of succeeding articles and a spring interposed between said article-engaging arm and said stop for moving the stop into obstructing position, the resilience of said spring permitting said arm to move out of the path of an article engaged thereby while the movement of the stop is obstructed by the said article, said spring thereafter serving to move the stop into obstructing position.

4. In a conveying system, the combination with a conveyor of stop mechanism actuable by a moving article on the conveyor to block the passage of another article being conveyed, said stop mechanism comprising a normally inoperative stop, an article-engaging arm for moving said stop into a position in the path of conveyed articles, a latch independent of said arm for retaining said stop in said position, a yieldable connection between said latch and arm and means, actuable by contact with a moving article, for releasing said latch and actuable through said connection to return said stop to an inoperative position.

5. In a conveying system, the combination with a conveyor of stop mechanism actuable by a moving article on a conveyor to block the passage of another article being conveyed, said stop mechanism comprising a normally inoperative stop, an article-engaging arm for moving said stop into a position in the path of conveyed articles, a latch independent of said arm for retaining said stop in said position, a connection between said latch and said arm and means, actuable by contact with a moving article, for releasing said latch, and for acting through said connection to return said stop to an inoperative position.

6. In a conveying system, the combination with a conveyor for articles, of a movable stop for blocking the passage of conveyed articles, means for moving said stop into blocking position, locking means independent of said moving means for positively locking said stop in its blocking position, means actuable by contact with a moving article for unlocking said locking means and means actuable by said locking means for moving said stop into an inoperative position.

7. In a conveying system, the combination with a conveyor for articles, of movable stop mechanism for blocking the passage of conveyed articles, a latch movable independently of and into engagement engageable with said stop mechanism for retaining said stop mechanism in a blocking position, latch-releasing mechanism actuable by contact with a moving article for moving said latch to unlock said stop mechanism, and a connection between said latch and said stop mechanism for moving said stop mechanism into an inoperative position upon further movement of said latch-releasing mechanism.

8. In a conveying system, the combination with a conveyor for articles, of movable stop mechanism for blocking the passage of conveyed articles, locking mechanism for locking said stop mechanism in a blocking position, said locking mechanism permitting movement of said stop mechanism from an inoperative to a blocking position, a spring connection between said stop mechanism and said locking mechanism for moving said locking mechanism into locking relation to said stop mechanism upon movement of the latter into blocking position, a movable article-engaging trip, and a connection between said locking mechanism and said trip for moving said trip into position to be engaged by a moving article upon movement of said locking mechanism into locking relation to said stop mechanism.

9. In a conveying system for articles, a pair of conveyors adapted to convey articles in opposite directions, switching mechanism for transferring conveyed articles from one conveyor to the other, stop mechanism actuable by an article approaching said switching mechanism for stopping the forward movement of another article approaching the switching mechanism, and release mechanism, actuable by an article after passing said switching mechanism, for causing said stop mechanism to permit succeeding articles to pass.

10. In a conveying system for articles, a pair of conveyors adapted to convey articles in opposite directions, switching mechanism for transferring conveyed articles from one conveyor to the other, stop mechanism actuable by an article approaching said switching mechanism for stopping the forward movement of another article approaching the switching mechanism on one of the conveyors, and release mechanism actuable by an article on the other conveyor after passing said switching mechanism, for causing said stop mechanism to permit succeeding articles to pass.

11. In a conveying system for articles, a conveyor, a second conveyor adapted to receive articles from said first-named conveyor, switching mechanism for transferring conveyed articles from the first conveyor to the second conveyor, stop mechanism associated with said first conveyor and actuable by an article thereon for stopping the forward movement of a succeeding article, and release mechanism actuable by the article which has actuated said stop mechanism, after transfer of said article to the second conveyor, for releasing said stop mechanism to permit the succeeding article to pass said stop mechanism, the stop mechanism thus preventing collision of an article being transferred with a succeeding article.

12. In a conveying system for articles, a conveyor, a second conveyor adapted to receive articles from said first-named conveyor, switching mechanism for transferring conveyed articles from the first conveyor to the second conveyor, a stop movable into the path of articles on said first-named conveyor, an arm engageable with articles moving on said conveyor, a connection between said arm and said stop whereby upon movement of said arm by an article said stop is moved into a position in the path of succeeding articles, latch mechanism for retaining said stop in this position, a trip engageable with articles on the second conveyor, and a connection between said trip and said latch whereby movement of the trip by an article releases the latch.

13. In a conveying system for articles, a conveyor, a second conveyor, switching mechanism for transferring certain of the articles on the first conveyor to the second conveyor, other articles continuing their travel on the first conveyor past said switching mechanism, stop mechanism actuated by each article on the first conveyor as it approaches said switching mechanism to prevent the approach of other articles to said switching mechanism and releasing means actuated by said article after passing said switching mechanism on either conveyor for returning said stop mechanism to inoperative position and permitting the articles on the first conveyor to resume their approach to the switching mechanism.

14. In a conveying system for articles, a conveyor, a second conveyor, switching mechanism for transferring articles conveyed by the first conveyor to the second conveyor, both said conveyors being adapted to advance articles to said switch mechanism, stop mechanism actuated by an article approaching said switching mechanism on either conveyor to prevent the approach to the switching mechanism of other articles on either conveyor and release mechanism associated with each conveyor and actuated by the articles conveyed thereby past said switching mechanism for returning said stop mechanism to inoperative position and permitting articles on each conveyor to resume their approach to the switching mechanism.

15. In a conveying system for articles, a conveyor, a second conveyor, switching mechanism for transferring articles on the first conveyor to the second conveyor, both said conveyors acting to convey articles to said switching mechanism and means actuated by the leading article which approaches said switching mechanism on either of said conveyors for preventing the approach of a second article thereto until the first article has passed said mechanism.

Signed by me at Syracuse, New York, this seventeenth day of May, 1930.

CHARLES ROBERT LIBBY.